United States Patent [19]
Burgis et al.

[11] 4,034,846
[45] July 12, 1977

[54] METHOD AND APPARATUS FOR PROVIDING AUTOMATIC STACKING OF MANUFACTURED PARTS

[75] Inventors: William J. Burgis, Park Ridge; Gregory P. Stewart, Des Plaines, both of Ill.

[73] Assignee: Bunting Magnetics Company, Elk Grove Village, Ill.

[21] Appl. No.: 571,710

[22] Filed: Apr. 25, 1975

[51] Int. Cl.² ........................................ B65G 57/00
[52] U.S. Cl. ............................ 198/422; 93/93 DP; 198/431; 214/6 D; 271/213
[58] Field of Search ............. 198/35, 41, 422, 431; 271/213; 93/93 R, 93 DP, 93 C; 214/6 D

[56] References Cited
U.S. PATENT DOCUMENTS

| 2,951,575 | 9/1960 | Gordon et al. | 198/35 |
| 3,120,890 | 2/1964 | Waltz | 198/41 X |
| 3,709,756 | 1/1973 | Watson | 214/6 D |
| 3,777,903 | 12/1973 | Kuckhermann | 93/93 DP |
| 3,831,781 | 8/1974 | Anikanov et al. | 198/422 |
| 3,880,297 | 4/1975 | Martin | 214/6 D |

Primary Examiner—Evon C. Blunk
Assistant Examiner—Douglas D. Watts
Attorney, Agent, or Firm—Johnson, Dienner, Emrich & Wagner

[57] ABSTRACT

A method and apparatus for conveying parts from a production machinery includes a first normally energized conveyor which conveys the parts from the production machinery to a first location, and discharges the parts into a parts stacking hopper at the first location, which stacks the parts on a second normally deenergized conveyor, and a photooptic control system which deenergizes the first conveyor and energizes the second conveyor when a predetermined number of parts have been stacked on the second conveyor to permit the stack of parts to be conveyed to a second location.

14 Claims, 3 Drawing Figures

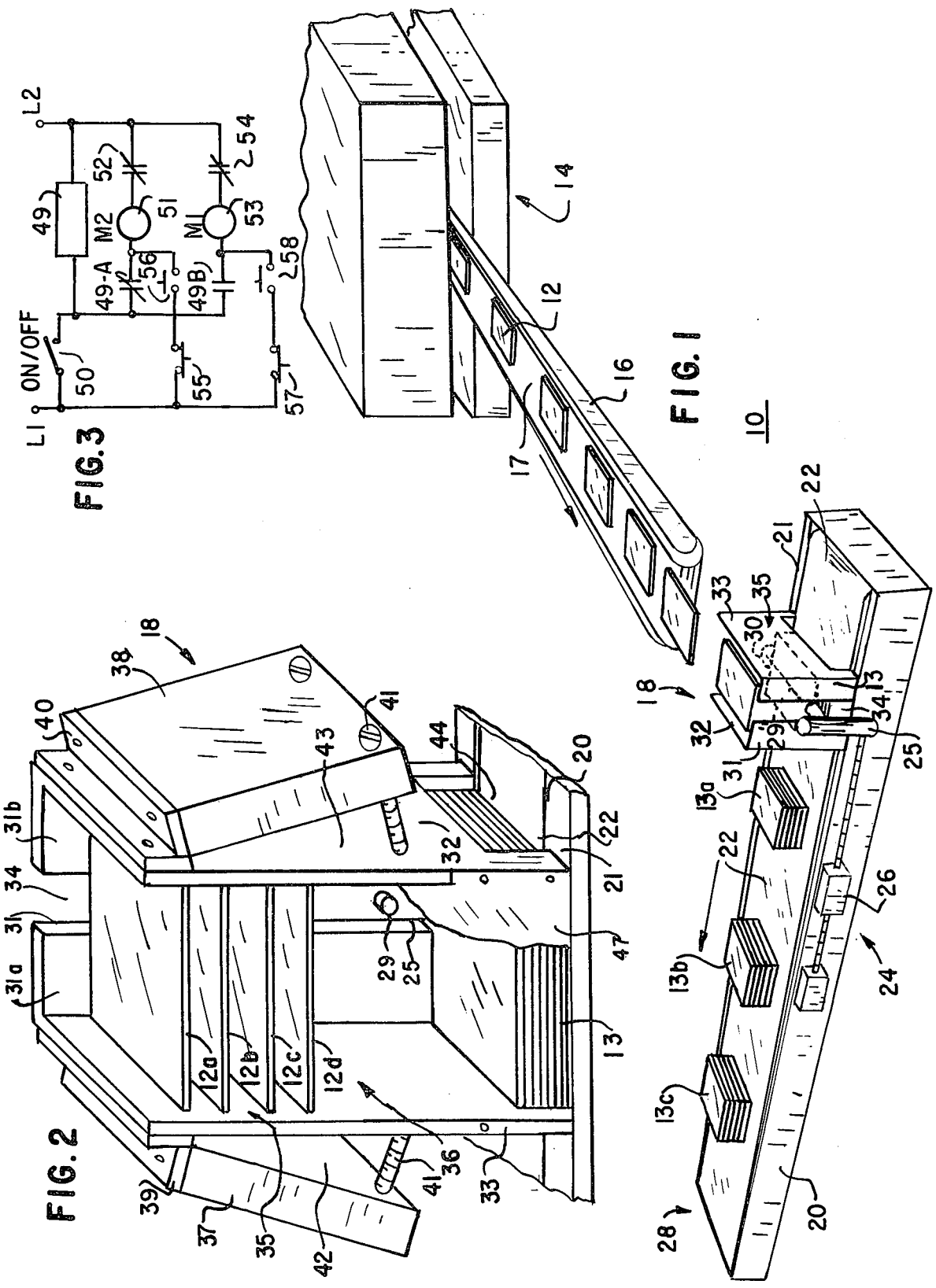

METHOD AND APPARATUS FOR PROVIDING AUTOMATIC STACKING OF MANUFACTURED PARTS

BACKGROUND OF THE INVENTION

1. Field of the Invention

This invention relates to manufacturing processes wherein manufactured parts are conveyed from production machinery to a packaging or shipping area over a plurality of conveyors, and more particularly, to a method and apparatus wherein manufactured parts are automatically stacked as they are conveyed from the production machinery which produces the parts.

2. Description of the Prior Art

In manufacturing processes, it is frequently necessary to convey manufactured parts from production machinery. For example, in a manufacturing process employing a punch press which stamps out parts of a desired size and shape from sheets of raw material, or blanks, the parts must be conveyed from the punch press, such operation normally being effected by way of a conveyor. In known systems, to facilitate transportation to a storage or shipping area manufacturing personnel manually remove the parts from the conveyor and stack the parts in piles on a pallet, or in boxes. Generally, an additional worker is required to monitor the punch press machinery. Also, since the parts are continuously produced at a fairly fast rate, a long conveyor is needed to provide the worker with adequate time to stack the parts without having to stop the punch press operation.

It would be desirable to provide for automatic stacking of parts as they are conveyed from a production machinery to minimize the number of manual production steps required in a manufacturing process and to increase the efficiency of the process.

SUMMARY OF THE INVENTION

It is therefore an object of the present invention to provide a method and apparatus for automatically stacking parts conveyed from a production machinery.

It is another object of the present invention to provide a method and apparatus which permits automatic stacking of parts in predetermined numbers as conveyed from a production machinery.

In accordance with the present invention, a method of providing automatic stacking of parts from a production machinery includes conveying the parts from the production machinery to a first location over a first conveyor means, stacking the conveyed parts on a second conveyor means at said first location, automatically determining when a predetermined number of parts have been stacked together on said second conveyor means, and conveying the stack of parts from said first location over said second conveyor means.

An apparatus for providing automatic stacking of parts from a production machinery includes a first normally energized conveyor means for conveying parts from said production machinery to a first location, a second normally deenergized conveyor means for conveying said parts from said first location to a second location and stacking hopper means disposed at an output end of said first conveyor means and an input end of said second conveyor means for transferring the parts from said first to said second conveyor means and for automatically stacking said parts on said second conveyor means. A control means, including a detecting means, determines when a predetermined number of such parts have been stacked together and energizes the second conveyor means to permit the stack of parts to be conveyed toward said second location. The control means then deenergizes said conveyor means to permit further parts discharged into said stacking hopper means to be stacked on said second conveyor means.

In accordance with a disclosed embodiment, the parts are of a magnetic material and the stacking hopper means comprises a magnetic stacking hopper which provides a magnetic field within an upper portion of the stacking hopper which draws the parts off the first conveyor means and causes a predetermined number of the parts to be suspended within the upper portion of the hopper. When further parts are drawn into the upper portion of the stacking hopper means, a like number of parts fall from a bottom portion of the stacking hopper means onto the second conveyor means and are stacked on top of one another.

In the exemplary embodiment, the detecting means of the control means comprises a photo-optic detector operable to detect a predetermined height of the stack on the stacking conveyor to control the energization and deenergization of the first and second conveyor means whenever the height of the stack reaches a predetermined value. Thus, the present invention has provided a method and apparatus for automatically stacking parts produced by a production machinery. The provision of first and second conveyor means and a stacking hopper means which transfers parts from the first conveyor means to the second conveyor means in a stacked relationship permits the parts to be stacked in close proximity to the production machinery and minimizes the amount of manual labor required in processing the manufactured parts. Accordingly, in a manufacturing operation which employs the new and improved materials handling process of the present invention, the operator of the production machinery can also remove the stacks of parts from the second conveyor means to boxes or transfer pallets. Such minimization of personel increases the efficiency of the manufacturing process and also results in cost savings.

In addition, the use of a photo-optic detecting means to determine when the height of a stack of parts has reached a predetermined value is a simple and yet effective way for providing the necessary control outputs for operating the first and second conveyor means.

DESCRIPTION OF THE DRAWINGS

FIG. 1 is a schematic representation of the parts conveying system provided by the present invention;

FIG. 2 is a simplified plan in view of a magnetic parts stacking hopper employed in the system shown in FIG. 1; and, FIG. 3 is a schematic circuit diagram for a control apparatus employed in the system shown in FIG. 1.

DESCRIPTION OF PREFERRED EMBODIMENTS

Referring to FIG. 1, there is shown a simplified representation of apparatus 10 for conveying and stacking parts 12 provided at the output of a production machinery 14. The apparatus 10 includes a normally energized conveyor 16, which conveys the parts 12 to a parts stacking hopper 18, which causes the parts to be stacked on a further normally deenergized conveyor 20. When a predetermined number of the parts 12 have been stacked on the conveyor 20, a control apparatus 24 deenergizes the conveyor 16 and energizes the conveyor 20 to move the stack 13 of parts 12 away from the stacking hopper 18 to a location indicated generally at 28 where the stack of parts 12 may be removed from the conveyor 20.

By way of illustration of the present invention, the production machinery 14 may comprise a punch press operable in a conventional manner to provide stamped parts of a desired size and shape from a supply of raw material or stock. The punch press may, for example, be the Bliss 100 Ton press which has a production rate of 110 parts per minute.

The parts 12, which in the illustrative embodiment are formed of a magnetic material, may, for example, be automotive parts, such as baffles or hydropans.

The parts provided at the output of the punch press 14 drop onto the press conveyor 16 and are conveyed by way of the conveyor 16 to the parts stacking hopper 18. In the exemplary embodiment, the press conveyor 16 is operated at a speed of 100 feet per minute to provide the desired spacing between the parts 12, relative to the output rate of the punch press 14. The press conveyor 16 has a magnetized conveyor belt 17 which has magnets (not shown) under the belt 17 magnetically attracts the parts 12 produced by the punch press 14 and prevents shifting of the parts 12 on the conveyor belt 17 as the parts 12 are moved from the punch press 14 to the stacking hopper 18. Also, no side guides or wipers are required so that the press conveyor 16 has a low profile and fits into a space beneath the punch press die, such space may, for example be only 1½ inches in height.

The stacking hopper 18 which is shown in simplified form in FIG. 1, comprises a hollow open ended box-like structure having a forward wall portion 31 and a pair of side walls 32 and 33, which may be mounted on the frame 21 of the conveyor 20 in a suitable manner. The stacking hopper 18 has an upper portion 35 and a lower portion 36. The forward wall portion 31 has two vertically extending panels 31a and 31b which define an opening 34 which permits a photo-optical sensor 25 of the control apparatus 24 to optically monitor the height of a stack of parts stacked on the conveyor 20, such as stack 13 shown in FIG. 1. The stacking hopper 18 has a rearward wall plate 47 disposed adjacent the press conveyor 16 and which extends approximately one-half the height of the stacking hopper 18.

The parts 12 discharged from the press conveyor 16 are drawn into the upper portion 35 of the hopper 18 and fall through the lower portion 36 of the hopper 18 onto the conveyor 20. The stacking hopper 18 may be a parts stacking hopper wherein the flow of parts through the hopper 18 is controlled by a magnetic field provided within the upper portion 35 of the hopper 18. The magnetic field serves to draw the magnetic parts 12 off the press conveyor 16 and to suspend a predetermined number of the parts 12 within the upper portion 35 of the hopper 18.

Referring to FIG. 2, which is a more detailed showing of one embodiment for the magnetic parts stacking hopper 18, for the purpose of establishing the magnetic field within the upper portion 35 of the hopper 18, a pair of generally rectangular magnetic fanner plates 37 and 38 (not shown in FIG. 1) are pivotally mounted on the side walls 32 and 33, respectively by way of suitable hinges 39 and 40. The fanner plates 37 and 38 may each comprise a rectangular ceramic permanent magnet of the type commercially available as SF1106 from Bunting Magnetics Co. Such plates 37 and 38 are approximately 6⅛ inches in length, 6⅞ inches in width, and 1¼ inches thick. Adjustment screw members, such as adjustment screw member 41, may be located at each of the two lower corners of the fanner plates 37 and 38 to permit adjustment of the angle of inclination of the fanner plates 37 and 38 relative to the side walls 32 and 33, and thus varying of the air gaps 42 and 43 therebetween. In one embodiment, the length of the air gaps 42 and 43 adjacent the hinges 39 and 40 was on the order of ⅜ inch and the air gap adjacent the adjustment screws 41 ranged from ¾ to 2⅛ inches. The side walls 32 and 33 are of non-magnetic material, such as aluminum, high impact plastic, or some other suitable material to direct the magnetic flux lines provided by the fanner plates 37 and 38 to the upper portion of the hopper 18, defining a fanning area.

The fanner plates 37 and 38 provide a magnetic field within the upper portion 35 of the hopper 18 of sufficient strength to cause a predetermined number of parts, such as four parts 12a–12d shown in FIG. 2, to be suspended within the upper portion 35 of the hopper 18. When additional parts 12 are drawn into the top of the hopper 18, a like number of parts 12 are forced out of the magnetic field and permitted to drop through the lower portion 36 of the hopper 18 and onto the top of the stack 13 on the conveyor 20.

Adjustment of the position of the fanner plates 37 and 38 increases or decreases the air gaps 42 and 43 thereby increasing or decreasing the strength of the magnetic field to permit more of fewer parts to be retained in the fanning area. While in the exemplary embodiment the field strength adjustment is achieved by varying the size of the air gaps 42 and 43, it is pointed out that other methods may be used, such as the shorting of lines of flux of the magnetic field provided within the hopper 18 or by employing a variable field magnet in place of the fanner plates 37 and 38.

The stacking hopper 18 serves to accumulate the parts 12 and to align the parts in a vertical orientation over the conveyor 20. The internal dimensions of the hopper 18 are selected to accommodate the size of the part being conveyed so that there is no interference between the part and the inside surfaces of the hopper 18. By way of example, the stacking hopper 18 may be approximately 6 inches long and 6 inches wide, and there may be a ¼ inch spacing between the parts 12, and the walls 31-33 of the hopper 18. The relative positions of the side walls 32 and 33, and panels 31a and 31b, and rear wall 47 may be adjustable to accommodate parts of different sizes for different production runs. Also, the fanner plates 37 and 38 are adjusted to assure that the parts 12 drop squarely through the hopper 18.

As shown in FIG. 2, the parts which have fallen through the lower portion 36 of the hopper 18 are stacked together on the conveyor belt 22 of the stacking conveyor 20. Referring again to FIG. 1, the stacking conveyor 20, which is normally deenergized is operable when energized to move the parts stacked on the conveyor 20 away from the location of the stacking hopper 18 toward the area 28 where the stacks, such as stacks 13a–13c, may be removed from the conveyor 20 and placed in boxes or on suitable pallets (not shown) to facilitate transfer to a storage or shipping area. It is pointed out, since the parts 12 are automatically stacked on the conveyor 20, and such stacking is done adjacent the punch press 14, the punch press operator may remove the stacks 13a–13c from the stacking conveyor 20.

As shown in FIG. 2, the side 32 of the stacking hopper 18 has a rectangular aperture 44 adjacent the upper surface of the conveyor belt 22, such aperture 44 being of sufficient length and width to permit the stack 13 to be moved out of the hopper 18. The stack 13 may, for example, include forty parts and may be of a total height of approximately three inches. The speed of the conveyor 20 may be the same as that of the press conveyor 16.

Referring to FIG. 1, the electrical control apparatus 24 which controls the operation of the press conveyor 16 and the stacking conveyor 20 includes a photo-optical sensor apparatus 25 and associated switching apparatus which may be housed in a control box 26. The photo-optic sensor 25 may be the type 42RL9 Reflex Control (photo-switch) commercially available from Electronics Corporation of America, Cambridge Mass.

The photo-optic sensor apparatus 25 is positioned adjacent the front wall portion 31 of tthe stacking hopper 18 and has a conventional photo-electric eye 29 (FIG. 2), positioned to direct a beam of light, indicated by the dotted line 29' in FIG. 1, through the lower portion 36 of the hopper 18, in which the parts 12 are stacked, toward a reflector 30.

The light beam is broken whenever the stack 13 reaches the predetermined height, that is, when the desired number of parts 12 are stacked on the stacking conveyor 20. The photo-electric eye apparatus 29 includes a timing or control relay (not shown) which energizes the press conveyor 16 and deenergizes the stacking conveyor 20 whenever the light beam is established between the photo-electric eye 29 and the reflector 30. The control relay deenergizes the press conveyor 16 and energizes the stacking conveyor 20 whenever the light beam is broken.

Referring to FIG. 3, there is shown a schematic circuit diagram for the electrical control apparatus 24. The photo-electric eye apparatus 29 includes a sensor/control device 49 which is connectable to a 115 VAC power source over a pair of power conductors L1 and L2 and an ON/OFF switch 50. The control device 49 of the conventional photo-electric eye apparatus 29 includes the control relay referred to above, a light source which directs a beam of light toward the reflector 30, and a light sensor which detects the light beam and controls the control relay which is deenergized or energized in correspondance with the presence or absence of the reflected light beam at the light sensor.

A motor 51 for the press conveyor 16 is connectable to the AC power source over the switch 50, normally closed contacts 49-A of the control relay (not shown) of the control device 49 and a normally closed thermal overload protection switch 52.

A motor 53 for the stacking conveyor 20 is connectable to the AC power source over normally open contacts 49-B of the control device 49 and a normally closed thermal overload protection switch 54.

A normally closed stop switch 55 and a normally open start 56, serially connected in shunt with contacts 49-A and the ON/OFF switch 50, are manually operable to permit energization and deenergization of the motor 51 to permit jogging of the press conveyor 16. A further normally closed stop switch 57 and a further normally open start switch 58, serially connected in shunt with contacts 49-B and the switch 50, are manually operable for energizing and deenergizing the motor 53 to permit jogging of the stacking conveyor 20.

In operation, when the ON/OFF switch 50 is operated, the photo-electric eye apparatus 29 is energized to establish a light beam through the stacking hopper 18. Also, the press conveyor motor 51 is energized over contacts 49-A and the press conveyor 16 conveys parts 12 to the stacking hopper 18. When the number of parts 12 are stacked on the stacking conveyor 20 is sufficient to block the light beam, the control device 49 causes contacts 49-A to open and contacts 49-B to close thereby deenergizing the press conveyor motor 51 and energizing the stacking conveyor motor 53. The control device 49 provides a time delay of 0.5 seconds such that the deenergization of the press conveyor motor 51 and the energization of the stacking conveyor motor 53 are not until the light beam has been broken for 0.5 seconds. When the stacking conveyor motor 53 is energized, the stacking conveyor 20 moves the stack 13 away from the stacking hopper 18. As soon as the stack 13 is moved past the photo-electric eye 29, the light beam is reestablished, and a 0.4 time delay is initiated by the control device 49 after which time the control relay releases to open contacts 49-B and to close contacts 49-A to halt the stacking conveyor 20 and to restart the press conveyor 16. The 0.4 second delay allows the stack 13 to be moved completely out of the stacking hopper 18 before the stacking conveyor 20 is deenergized. After such time delay, the press conveyor 16 is restarted to supply further parts 12 to the stacking hopper 18 and the cycle repeats.

It is pointed out that while the control apparatus 24 includes a photo-optical control arrangement to detect the number of parts 12 within the stacking hopper 18 (of stacked on the stacking conveyor 20), other arrangements may be employed for determining when a predetermined number of parts 12 have been stacked on thhe stacking conveyor 20. For example, suitable counting apparatus may be used at the end of the press conveyor 16 adjacent the hopper 18 to count the number of parts 12 passing a predetermined point, and to enable suitable switching devices to deenergize the press conveyor 16 to energize the stacking conveyor 20 after a predetermined number of parts 12 have been supplied to the stacking hopper 18 for stacking on the stacking conveyor 20.

Moreover, while the magnetic parts stacking hopper 18 has been described as being mounted on the stacking hopper 20, it is apparent that the stacking hopper 18 could also be attached to the output end of the press conveyor 16. Also, while in the illustrative embodiment, the press conveyor 16 and the stacking conveyor operate at the same speeds, and the control apparatus 26 causes the press conveyor 16 to be stopped whenever the stacking conveyor 20 is energized, it is also possible to operate the press conveyor 16 at a slower speed and to maintain the press conveyor 16 operating when the stacking conveyor 20 is operating.

Generally, the punch press 14 is maintained operating while the press conveyor 16 is deenergized and the stack 13 of parts 12 is moved from the location of the stacking hopper 18. In such case, two or more parts 12 provided at the output of the punch press 14 may become stacked on the press conveyor 16. However, the use of the magnetic parts stacking hopper 18 enables more than one part to be discharged into the hopper 18 without jamming. Also, the hopper 18 provides alignment of the parts 12 prior to the parts being deposited on the stacking conveyor 20.

We claim:

1. In a processing system including a production machinery for manufacturing parts of a magnetic material, apparatus for conveying said parts from said production machinery comprising in combination first conveyor means operable when energized to convey said parts from said production machinery to a first location, second normally deenergized conveyor means at said first location, magnetic stacking means at said first location including hopper means for receiving parts discharged from said first conveyor means, and means for establishing a magnetic field within said hopper means of sufficient strength to cause a given number of said parts to be suspended in said hopper means in vertical alignment above said second conveyor means and to permit the suspended parts to be discharged onto said second conveyor means in response to the discharge of further parts into said hopper means, for stacking said discharged parts on said second conveyor means, and control means for energizing said second conveyor means when a predetermined number of parts have been stacked on said second conveyor means to permit said stack of parts to be moved away from said first location towards a second location, said control means causing said second conveyor means to be deenergized at a predetermined time after said stack has been moved from said first location.

2. A system as set forth in claim 1 wherein said control means comprises photo-optical means enabled when the height of the stack of parts reaches a predetermined value to effect energization of said second conveyor means and deenergization of said first conveyor means.

3. A system as set forth in claim 2 wherein said photo-optical means is operable to effect energization of said second conveyor means and deenergization of said first conveyor means after a first predetermined time delay after the height of said stack of parts reaches said predetermined value and to effect energization of said first conveyor means and deenergization of said second conveyor means after a second predetermined time delay after said stack of parts has been moved from said stacking means.

4. In a processing system including a production machinery for manufacturing parts of a magnetic material, apparatus for conveying said parts from said production machinery comprising in combination first conveyor means operable when energized to convey said parts from said production machinery to a first location, second normally deenergized conveyor means at said first location, stacking means at said first location for receiving said parts from said first conveyor means and for stacking said parts on said second conveyor means, said stacking means including a magnetic parts stacking hopper means having an upper portion disposed adjacent said first conveyor means for accumulating parts discharged into said upper portion from said first conveyor means, a lower portion disposed adjacent said second conveyor means, and means for establishing a magnetic field within said upper portion of said stacking hopper means for normally permitting a predetermined number of said parts to be suspended within said upper portion in a vertical stacked relationship and for permitting the lower most one of the suspended parts to drop through said lower portion of said stacking hopper means and onto said second conveyor means whenever a further part is discharged into said upper portion of said stacking hopper means whereby said parts are stacked on said second conveyor means, and control means for normally energizing said first conveyor means and operable when a predetermined number of parts have been stacked on said second conveyor means to energize said second conveyor means and to deenergize said first conveyor means to permit said stack of parts to be moved away from said first location towards a second location, said control means causing said second conveyor means to be deenergized and said first conveyor means to be energized at a predetermined time after said stack has been moved from said first location.

5. A system as set forth in claim 4 wherein said means for establishing said magnetic field comprises first and second plates of magnetic material mounted on said upper portion of said stacking hopper means, and means for adjusting the positions of said first and second plates.

6. A system as set forth in claim 4 wherein said stacking hopper means is mounted on and supported by said second conveyor means.

7. A system as set forth in claim 4 wherein said first conveyor means includes a magnetized conveyor belt, and wherein said magnetic field of said stacking hopper means causes said parts to be drawn off said magnetic conveyor belt and into said upper portion of said stacking hopper means.

8. A system as set forth in claim 4 wherein said control means comprises a photo-optical detecting means disposed adjacent said lower portion of said stacking hopper means for directing a beam of light toward said stack of parts on said second conveyor means and for providing a control output for deenergizing said first conveyor means and energizing said second conveyor means whenever the height of said stack of parts reaches a predetermined value and interrupts said beam of light.

9. In a processing system including a production machinery for manufacturing parts of a magnetic material, apparatus for conveying said parts from said production machinery comprising in combination first conveyor means operable to convey said parts from said production machinery to a first location, second normally deenergized conveyor means at said first location, magnetic stacking means at said first location including hopper means for receiving said parts discharged from said first conveyor means and means for establishing a constant magnetic field within said hopper means for causing a given number of said parts to be suspended in said hopper means, and for permitting said suspended parts to drop onto said second conveyor means as further parts are discharged into said hopper means, control means including switching means for normally deenergizing said second conveyor means, and detecting means operable when a predetermined number of parts have been stacked on said second conveyor means to enable said switching means to energize said second conveyor means, to permit said stack of parts to be moved away from said first location towards a second location, said detecting means being responsive to said stack being moved from said stacking means to disable said switching means to deenergize said second conveyor means at a predetermined time after said stack has been moved from said first location.

10. A system as set forth in claim 9 wherein said detecting means comprises photo-optical means enabled when the height of the stack of parts reaches a predetermined value to effect energization of said second conveyor means.

11. In a processing system including a production machinery for manufacturing parts from magnetic material, apparatus for conveying said parts and for automatically stacking said parts comprising in combination first conveyor means operable when energized to convey the parts provided by said production machinery to a first location, second conveyor means at said first location operable when energized to convey said parts from said first location to a second location, stacking hopper means at the first location having an upper portion and a lower portion, and means for establishing a magnetic field within said upper portion of said hopper means, whereby a predetermined number of said magnetic parts are normally suspended within said upper portion of said hopper means and additional parts discharged into said upper portion, cause a like number of parts to drop through said lower portion of said hopper means and to be stacked on said second conveyor means, and control means including photo-optical means disposed adjacent said lower portion of said hopper means, and switching means controlled by said photo-optical means for normally energizing said first conveyor means and for deenergizing said second conveyor means, said photo-optical means being operable whenever a predetermined number of said parts are stacked on said second conveyor means to deenergize said first conveyor means and to energize said second conveyor means to permit said stack of parts to be moved from said hopper means toward said second location, said photo-optical means being operable when said stack of parts has been moved a predetermined distance from said hopper means to deenergize said second conveyor means and to energize said first conveyor means.

12. In a system for manufacturing parts, a method for conveying parts of a magnetic material from a production machinery to a first location comprising energizing a first conveyor means to move the parts from the production machinery to a location intermediate said production machinery and said first location, providing a magnetic field for drawing each of said parts off said first conveyor means, and suspending said parts in vertical alignment above a second normally deenergized conveyor means at said intermediate location, enabling a predetermined number of said suspended parts to be stacked on said second conveyor means, automatically determining when said predetermined number of said parts has been stacked on said second conveyor means, causing said second conveyor means to be energized after a predetermined time delay after said predetermined number of parts has been stacked on said second conveyor means to permit said stack of parts to be moved toward said first location, and causing said second conveyor means to be deenergized after a second predetermined time delay.

13. In a system for manufacturing parts, a method for conveying parts of a magnetic material from a production machinery to a first location comprising energizing a first conveyor means to move the parts from the production machinery to a location intermediate said production machinery and said first location, automatically stacking a predetermined number of said parts on a second normally deenergized conveyor means at said intermediate location, including providing a magnetic field for drawing said parts off said first conveyor means and for suspending said parts in vertical alignment above said second conveyor means, and adjusting the strength of the magnetic field to cause a predetermined number of said parts to be suspended within said magnetic field at a given time and to enable the lowermost ones of the suspended parts to be stacked on said second conveyor means as further parts are drawn into said magnetic field from said first conveyor means, automatically determining when said predetermined number of said parts have been stacked on said second conveyor means, causing said first conveyor means to be deenergized and said second conveyor means to be energized after a predetermined time delay after said predetermined number of parts have been stacked on said second conveyor means to permit said stack of parts to be moved toward said first location, and causing said second conveyor means to be deenergized and said first conveyor means to be energized after a second predetermined time delay.

14. A method as set forth in claim 13 wherein determining when a predetermined number of parts have been stacked on said second conveyor means includes directing a beam of light towards said stack of parts and detecting the beam of light by a photo-sensor means.

* * * * *